US010836368B2

(12) United States Patent
Kim

(10) Patent No.: US 10,836,368 B2
(45) Date of Patent: Nov. 17, 2020

(54) MASTER CYLINDER AND ELECTRONIC BRAKE SYSTEM INCLUDING THE SAME

(71) Applicant: MANDO CORPORATION, Gyeonggi-do (KR)

(72) Inventor: Jin Seok Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/258,537

(22) Filed: Jan. 25, 2019

(65) Prior Publication Data

US 2019/0232935 A1 Aug. 1, 2019

(30) Foreign Application Priority Data

Jan. 30, 2018 (KR) .................. 10-2018-0011228

(51) Int. Cl.
*B60T 17/22* (2006.01)
*B60T 13/68* (2006.01)
(Continued)

(52) U.S. Cl.
CPC .............. *B60T 13/686* (2013.01); *B60T 7/04* (2013.01); *B60T 8/4086* (2013.01); *B60T 11/20* (2013.01);
(Continued)

(58) Field of Classification Search
CPC ........ B60T 8/326; B60T 8/4081; B60T 13/62; B60T 13/142; B60T 13/167; B60T 13/662; B60T 13/686; B60T 13/745
(Continued)

(56) References Cited

U.S. PATENT DOCUMENTS 5,603,217 A   2/1997 Majersik et al.
5,729,979 A   3/1998 Shaw et al.
(Continued)

FOREIGN PATENT DOCUMENTS

EP   0 820 912        1/1998
EP   2 520 473 A1    11/2012
(Continued)

OTHER PUBLICATIONS

Extended European Search Report dated May 23, 2019 for European Patent Application No. 19154259.6.

*Primary Examiner* — Christopher P Schwartz
(74) *Attorney, Agent, or Firm* — Ladas & Parry, LLP

(57) ABSTRACT

A master cylinder and an electronic brake system including the same are disclosed. The master cylinder includes a cylinder body connected to a reservoir and provided with a bore, one end of which is opened in a longitudinal direction, a piston configured to be movable forward and backward within the bore, and at least one master chamber configured to discharge a master chamber in response to a displacement of the piston. The master cylinder includes a pedal simulator provided in the bore. The pedal simulator is spaced apart from the piston by a predetermined distance, is directly pressurized by a brake pedal, and thus provides reaction force. The simulation chamber is formed in the bore, and is separated from the master chamber by the pedal simulator. The simulation passage connects the simulation chamber to the master chamber. The simulation valve is provided in the simulation passage, and controls flow of a pressing medium in response to an opening/closing operation thereof.

13 Claims, 5 Drawing Sheets

(51) Int. Cl.
  *B60T 11/20* (2006.01)
  *B60T 8/40* (2006.01)
  *B60T 7/04* (2006.01)
  *B60T 13/66* (2006.01)
  *B60T 13/74* (2006.01)
(52) U.S. Cl.
  CPC .......... *B60T 13/662* (2013.01); *B60T 13/745* (2013.01); *B60T 8/4072* (2013.01); *B60Y 2400/81* (2013.01)
(58) Field of Classification Search
  USPC ...... 188/358, 359; 303/114.1, 3, 15, 20, 155
  See application file for complete search history.

(56) References Cited

U.S. PATENT DOCUMENTS

| | | | | |
|---|---|---|---|---|
| 6,217,127 | B1* | 4/2001 | Kusano | B60T 7/042 303/3 |
| 7,159,696 | B2* | 1/2007 | Kusano | B60T 8/4081 188/152 |
| 7,331,641 | B2* | 2/2008 | Kusano | B60T 8/4081 188/359 |
| 7,488,047 | B2* | 2/2009 | Hatano | B60T 8/267 303/122.09 |
| 8,186,772 | B2* | 5/2012 | Suzuki | B60T 8/3655 188/358 |
| 10,513,249 | B2* | 12/2019 | Kim | B60T 8/17 |
| 2014/0345272 | A1* | 11/2014 | Kistner | B60T 8/4081 60/537 |
| 2016/0159331 | A1* | 6/2016 | Yang | B60T 13/142 303/15 |
| 2017/0158180 | A1 | 6/2017 | Kim et al. | |
| 2018/0339692 | A1* | 11/2018 | Jeong | B60T 8/4081 |
| 2019/0366994 | A1* | 12/2019 | Kim | B60T 8/4086 |

FOREIGN PATENT DOCUMENTS

| | | |
|---|---|---|
| JP | 2005-145280 | 6/2005 |
| JP | 5126039 | 1/2013 |

\* cited by examiner

NORMAL MODE

FALLBACK MODE

MASTER CYLINDER AND ELECTRONIC BRAKE SYSTEM INCLUDING THE SAME

CROSS-REFERENCE TO RELATED APPLICATION

This application is based on and claims priority under 35 U.S.C. § 119 to Korean Patent Application No. 10-2018-0011228, filed on Jan. 30, 2018 in the Korean Intellectual Property Office, the disclosure of which is incorporated by reference in its entirety.

BACKGROUND

1. Field

Embodiments of the present disclosure relate to a master cylinder and an electronic brake system including the same, and more particularly to a master cylinder in which a pedal simulator for providing a pedal effort to the master cylinder for use in an electronic brake system for generating braking force using an electrical signal corresponding to a displacement of a brake pedal is arranged in series to at least one piston, and an electronic brake system including the same.

2. Description of the Related Art

A brake system for braking of a vehicle is essentially mounted to a vehicle, and various systems for electronically controlling a brake hydraulic pressure transferred to wheel cylinders mounted to wheels have recently been proposed to obtain stronger and more stable braking force.

Examples of brake systems include anti-lock brake systems (ABSs) to prevent slippage of wheels during braking, brake traction control systems (BTCSs) to prevent slippage of driving wheels during sudden unintended acceleration from a stop or upon rapid acceleration of a vehicle, and electronic stability control systems (ESCs) to stably maintain a driving state of vehicles by controlling a brake hydraulic pressure through combination of an anti-lock brake (ABS) system with a brake traction control system.

Generally, an electronic brake includes a hydraulic-pressure supply device. Once a driver pushes a brake pedal, the actuator senses displacement of the pedal through a pedal displacement sensor, and receives an electric signal indicating the driver's braking intention from the pedal displacement sensor, such that pressure is supplied to the wheel cylinders.

An electronic brake system provided with such a hydraulic-pressure supply device has been disclosed in European Registered Patent No. EP 2 520 473. According to this European Patent document, the actuator is configured such that a motor is activated according to a pedal effort of a brake pedal to generate braking pressure. At this point, the braking pressure is generated by converting a rotational force of the motor into a rectilinear movement to pressurize a piston.

In order to provide proper pedal feel for a vehicle driver during braking of the vehicle, an additional pedal simulator (or also referred to as a pedal-feel simulator) is mounted to the electronic brake system, such that stable pedal feel is provided to the driver. That is, the pedal simulator includes a plurality of springs and a plurality of rubber dampers, is connected to a master cylinder, and is pressurized by hydraulic pressure corresponding to a pedal effort of a brake pedal, thereby providing repulsive force to the brake pedal.

However, since the pedal simulator is installed separately from the master cylinder, the electronic brake system may unavoidably increase in volume such that it is difficult to easily install such a bulky electronic brake system in the vehicle. As a result, when the pedal simulator is mounted to the master cylinder, the master cylinder increases in length, such that it is difficult to easily install such a long master cylinder in the vehicle and connection of flow passages becomes complicated in structure.

CITED REFERENCE

Patent Document

European Registered Patent No. EP 2 520 473 A1 (Honda Motor Co., Ltd.), (Nov. 7, 2012)

SUMMARY

Therefore, it is an aspect of the present disclosure to provide a master cylinder and an electronic brake system including the same, which include a pedal simulator installed in the master cylinder to minimize the length of the master cylinder, reduce the number of valves by simplifying a connection structure of flow passages, resulting in increased productivity.

Additional aspects of the disclosure will be set forth in part in the description which follows and, in part, will be obvious from the description, or may be learned by practice of the disclosure.

In accordance with an aspect of the present disclosure, a master cylinder includes a cylinder body connected to a reservoir and provided with a bore, one end of which is opened in a longitudinal direction, a piston configured to be movable forward and backward within the bore, and at least one master chamber configured to discharge a master chamber in response to a displacement of the piston. The master cylinder includes a pedal simulator provided in the bore. The pedal simulator is spaced apart from the piston by a predetermined distance, is directly pressurized by a brake pedal, and thus provides reaction force. The simulation chamber is formed in the bore, and is separated from the master chamber by the pedal simulator. The simulation passage connects the simulation chamber to the master chamber. The simulation valve is provided in the simulation passage, and controls flow of a pressing medium in response to an opening/closing operation thereof.

When the electronic brake system normally operates, the simulation valve may be closed to prevent the pressing medium from flowing between the master chamber and the simulation chamber in a manner that movement of the piston is restricted and the pedal simulator operates such that the simulation valve receives reaction force.

When the electronic brake system abnormally operates (i.e., fallback mode), the simulation valve may be open to allow the pressing medium to flow between the master chamber and the simulation chamber in a manner that the piston moves from the pedal simulator while being in press contact with the pedal simulator, and the pressing medium contained in the master chamber may be transmitted to at least one wheel cylinder installed in at least one wheel after passing through the simulation chamber.

The bore may include a first bore formed in a manner that the piston is movable forward and backward therein, resulting in formation of the master chamber, and a second bore, a diameter of which is longer than that of the first bore, configured to form the simulation chamber.

The pedal simulator may include a reaction force piston slidably movable within the bore, and configured to be directly pressurized by the brake pedal, a damping member provided in contact with the reaction force piston, be pressed in response to movement of the reaction force piston, and thus provide reaction force, and a support member spaced apart from the reaction force piston by a predetermined distance so as to support the damping member.

The pedal simulator may further include a reaction force spring supported by the support member, and configured to provide reaction force after being pressurized in response to movement of the reaction force piston, and thus provide reaction force.

The reaction force piston may include a coupling groove in which one end of the damping member is inserted, and an extension portion configured to extend from an outer circumference of the reaction force piston, and thus support one end of the reaction force spring.

The support member may include an insertion groove in which other end of the damping member is inserted, and a flange portion configured to extend from an outer circumference of the support member, and thus support other end of the reaction force spring.

In accordance with another aspect of the present disclosure, an electronic brake system includes a master cylinder. The master cylinder includes a cylinder body connected to a reservoir, and configured to have a bore, one end of which is opened in a longitudinal direction, a piston configured to be movable forward and backward within the bore, and first and second master chambers respectively formed in bores located at front and rear sides of the piston, and configured to discharge a pressing medium. The electronic brake system further includes a pedal simulator provided in a bore, configured to be spaced apart from the piston by a predetermined distance, and provide reaction force after being directly pressurized by a brake pedal, a simulation chamber configured to be separated from the first master chamber by the pedal simulator, and be formed in the bore, a simulation passage configured to connect the simulation chamber to the first master chamber, and a simulation cylinder provided in the simulation passage, and configured to control flow of the pressing medium in response to an opening/closing operation thereof, a hydraulic-pressure supply device configured to operate by an electrical signal of a pedal displacement sensor detecting a displacement of the brake pedal, a hydraulic control unit provided with first and second hydraulic circuits, each of which controls flow of hydraulic pressure applied to wheel cylinders installed in wheels by controlling hydraulic pressure discharged from the master cylinder or the hydraulic-pressure supply device, a first backup passage configured to connect the simulation chamber to the second hydraulic circuit, a second backup passage configured to connect the second master chamber to the first hydraulic circuit, a cut valve provided in the second backup passage, and configured to control flow of the pressing medium, and an electronic control unit configured to control the hydraulic-pressure supply device and a plurality of valves based on information about hydraulic pressure and information about a displacement of the brake pedal.

The electronic brake system may further include a first reservoir passage through which the simulation chamber communicates with the reservoir, and a second reservoir passage through which the second master chamber communicates with the reservoir. The first reservoir passage is provided with an inspection valve that controls flow of the pressing medium.

The first backup passage, one end of which is branched from a location interposed between the inspection valve and the simulation chamber in the first reservoir passage, and other end of which is connected to the second hydraulic circuit, may be configured.

The second hydraulic circuit may include at least one inlet valve configured to control hydraulic pressure flowing into each wheel cylinder, and at least one outlet valve configured to control hydraulic pressure discharged from each wheel cylinder, and the other end of the first backup passage is connected to a downstream side of the outlet valve in the second hydraulic circuit.

The first hydraulic circuit may include at least one inlet valve configured to control hydraulic pressure flowing into each wheel cylinder, and at least one outlet valve configured to control hydraulic pressure discharged from each wheel cylinder. The second backup passage, one end of which is connected to the second master chamber, and other end of which is connected to a location interposed between the inlet valve and the outlet valve in the first hydraulic circuit, may be configured.

When the electronic brake system normally operates, the simulation valve may be closed to prevent flow of the pressing medium between the first master chamber and the simulation chamber in a manner that movement of the piston is restricted, such that the simulation valve receives reaction force produced by the pedal simulator.

When the electronic brake system abnormally operates (i.e., fallback mode), the simulation valve may be open to allow the pressing medium to flow between the master chamber and the simulation chamber in a manner that the piston moves from the pedal simulator while being in press contact with the pedal simulator, the pressing medium contained in the master chamber is transmitted to the second hydraulic circuit through the simulation chamber and the first backup passage, and the pressing medium contained in the second master chamber is transmitted to the first hydraulic circuit through the second backup passage.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
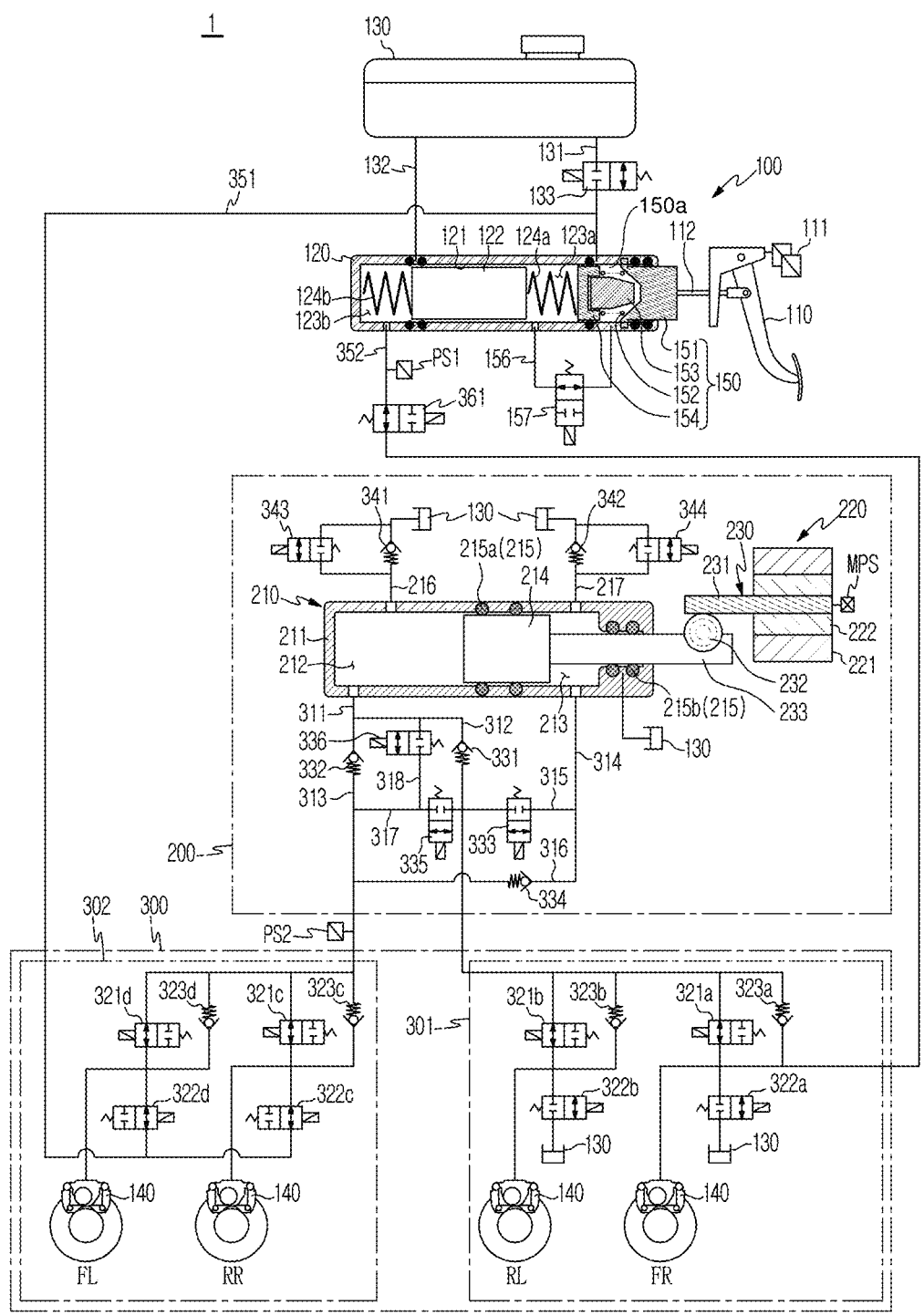
FIG. 1 is a hydraulic circuit diagram illustrating an electronic brake system according to an embodiment of the present disclosure.

Reference will now be made in detail to the embodiments of the present disclosure, examples of which are illustrated in the accompanying drawings, wherein like reference numerals refer to like elements throughout. The scope or spirit of the present disclosure is not limited to the embodiments and may be realized in various other forms. The embodiments are only provided to more completely illustrate the present disclosure and to enable a person having ordinary skill in the art to fully understand the scope of the present disclosure. In the drawings, sizes and shapes of elements may be exaggerated or reduced for convenience and clarity of description.

FIG. 1 is a hydraulic circuit diagram illustrating an electronic brake system 1 according to an embodiment of the present disclosure.

Referring to FIG. 1, the electronic brake system 1 may include a master cylinder 100 to pressurize and discharge a pressing medium (e.g., brake fluid) included therein according to a pedal effort of a brake pedal 110 depressed by a driver of a vehicle, a reservoir 130 formed to communicate with the master cylinder 100 to store the pressing medium, at least one wheel cylinders 140 to perform braking of respective wheels RR, RL, FR, and FL upon receiving hydraulic pressure generated by the pressing medium, a pedal simulator 150 installed in the master cylinder 100 so as to provide the driver with reaction force corresponding to a pedal effort of the brake pedal 110.

The master cylinder 100 may be configured to have at least one chamber, such that the master cylinder 100 may pressurize and discharge the pressing medium therein.

Figure 2:
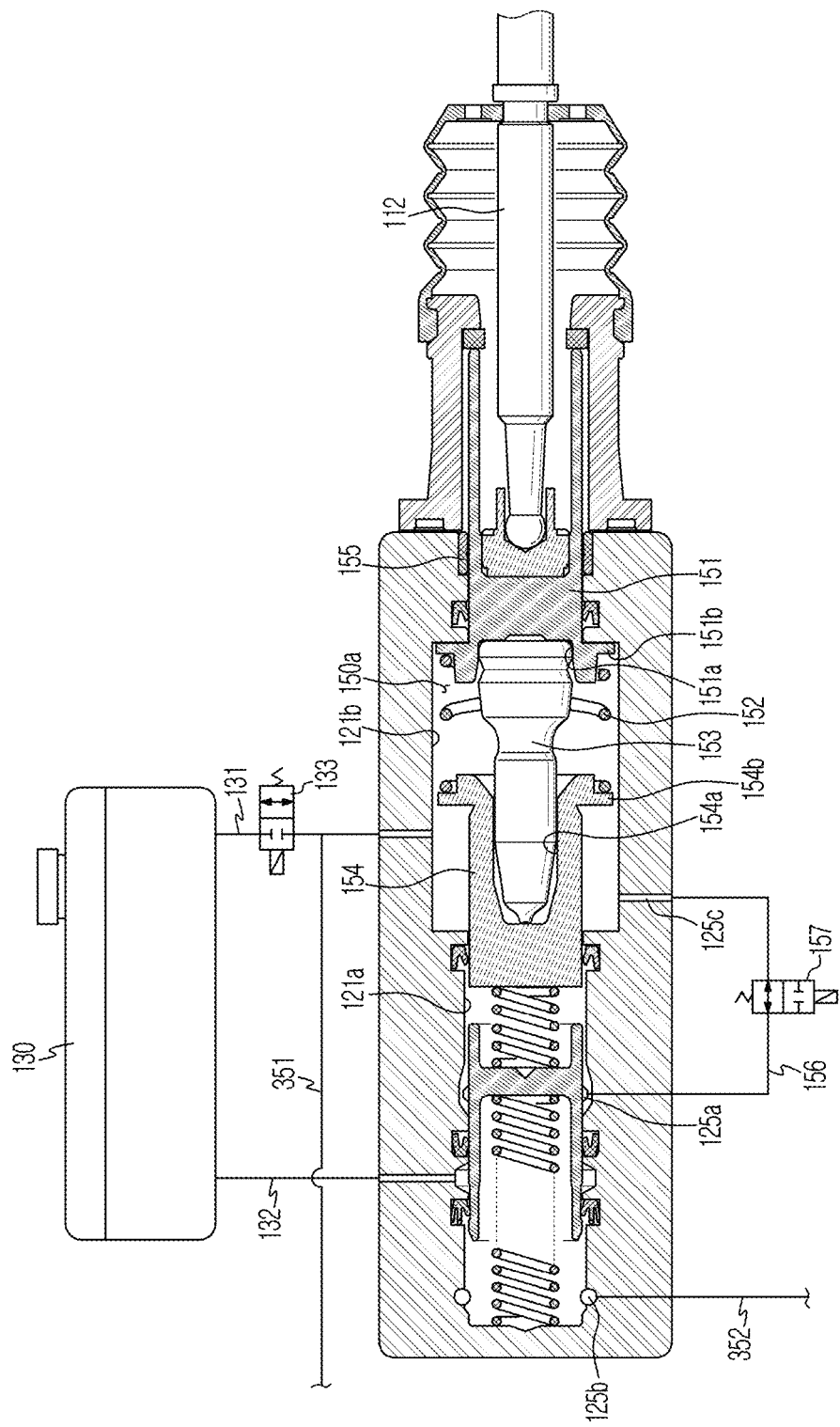
FIG. 2 is an enlarged view illustrating a master cylinder, a reservoir, and a reservoir passage for use in the electronic brake system according to an embodiment of the present disclosure.

FIG. 2 is an enlarged view illustrating a master cylinder, a reservoir, and a reservoir passage for use in the electronic brake system according to an embodiment of the present disclosure.

Referring to FIG. 2, the master cylinder 100 may include a cylinder body 120, a piston 122, and a pedal simulator 150. The cylinder body 120 may be connected to a reservoir 130, and may be provided with a bore 121 having a longitudinal hollow. The piston 122 may be movable forward and backward within the bore 121, resulting in formation of master chambers 123a and 123b. The pedal simulator 150 may be spaced apart from the piston 122 by a predetermined distance in a manner that the pedal simulator 150 can be directly pressurized by a brake pedal 110.

In more detail, a first master chamber 123a and a second master chamber 123b spaced apart from each other by the piston 122 interposed therebetween may be disposed in the bore 121 formed in the cylinder body 120. In this case, since the pedal simulator 150 is spaced apart from the piston 122 by a predetermined distance, the first master chamber 123a may be disposed between the piston 122 and the pedal simulator 150. Thus, the bore 121 may include a first bore 121a and a second bore 121b. The first bore 121a may be provided in a manner that piston 122 moves forward and backward so that the first master chamber 123a and the second master chamber 123b are formed. The second bore 121b may extend to have a larger diameter than the first bore 121a such that the pedal simulator 150 can be installed in the second bore 121b. In this case, the second bore 121b may be formed as a simulation chamber 150a by the pedal simulator 150.

A first spring 124a may be disposed between the piston 122 and the pedal simulator 150, and a second spring 124b may be disposed between the piston 122 and one end of the cylinder body 120. That is, the first spring 124a may be contained in the first master chamber 123a, and the second spring 124b may be contained in the second master chamber 123b.

The first master chamber 123a may communicate with a first hydraulic port 125a and may be connected to a third hydraulic port 125a that is formed to communicate with the simulation chamber 150a through a simulation passage 156 to be described later. Thus, the pressing medium stored in the first master chamber 123a may flow into or out of the simulation chamber 150a. The simulation passage 156 may include a simulation valve 157 such that flow of the pressing medium can be controlled in response to an opening/closing operation of the simulation valve 157. For example, the simulation valve 157 may be implemented as a normally closed (NC) solenoid valve that remains closed in a normal state and is then closed upon receiving an opening signal from an electronic control unit (ECU) (not shown).

The second master chamber 123b may communicate with a second hydraulic port 125b through which a pressing medium is input and output.

In addition, the simulation chamber 150a may be connected to the reservoir 130 through a first reservoir passage 131, and the second master chamber 123b may be connected to the reservoir 130 through a second reservoir passage 132. In this case, an inspection valve 133 may be provided in the first reservoir passage 131.

The inspection valve 133 may be implemented as a bidirectional control valve to control bidirectional flow of the pressing medium between the reservoir 130 and the cylinder body 20 (i.e., the simulation chamber 150a). The inspection valve 133 may be implemented as a normally closed (NC) solenoid valve that remains closed in a normal state and then opened upon receiving an opening signal from the ECU (not shown).

In addition, the simulation chamber 150a may be connected to a first backup passage 351, and the hydraulic port 125b may be connected to a second backup passage 352. In this case, the first backup passage 351 may be branched from the first reservoir passage 131. As illustrated in the drawings, the first backup passage 351 may be branched from the first reservoir passage 131 disposed between the inspection valve 133 and the simulation chamber 150a, such that the first backup passage 351 may be connected to downstream sides of outlet valves 332c and 332d of a second hydraulic circuit 302 to be described later. The second backup passage 352 may be disposed between inlet valves 321a and 321 b and outlet valves 332a and 332b of a first hydraulic circuit 301 to be described later. The second backup passage 352 may be provided with a cut valve configured to control flow of the pressing medium. The cut valve 361 may be implemented as a normally open (NO) solenoid valve that remains open in a normal state and is then closed upon receiving a closing signal from the ECU. In this case, as can be seen from the drawings, although the first backup passage 351 is connected to the second hydraulic circuit 302 and the second backup passage 352 is connected to the first hydraulic circuit for convenience of description, the scope or spirit of the present disclosure is not limited thereto, and it should be noted that the first backup passage 351 may also be connected to the first hydraulic circuit 301 and the second backup passage 352 may also be connected to the second hydraulic circuit 302 as necessary.

The pedal simulator 150 may be provided in the second bore 121b, such that the pedal simulator 150 may directly receive a pedal effort of the brake pedal 110 and may thus provide reaction force. The pedal simulator 150 may include a reaction force piston 151 provided in the simulation chamber 150, a damping member 153 configured to elastically support the reaction force piston 151, a support member 154 configured to support the reaction force spring 152 and the damping member 153, and a simulation valve 157 provided in a simulation passage 156 through which the simulation chamber is connected to the first master chamber 123a.

The reaction force piston 151 may be slidably movable within the simulation chamber 150a. As illustrated in the drawings, the reaction force piston 151 may be provided at the outermost open side of the cylinder body 120 such that the reaction force piston 151 is directly pressurized by the brake pedal 110. In other words, the reaction force piston 151 may be in close contact with an input rod 112 connected to the brake pedal 110. The reaction force piston 151 may include a coupling groove 151a and an extension portion 151b. One end of the damping member 153 may be inserted into the coupling groove 151a. The extension portion 151b may extend from an outer circumference of the reaction force piston 151, and may thus support one end of the reaction force spring 152. Accordingly, when the reaction force piston 151 is pressurized by a pedal effort applied to the brake pedal 110, the reaction force spring 152 and the damping member 153 may also be pressurized and then elastically deformed by such pressurization, such that the reaction force piston 151 may provide reaction force to the brake pedal 11. In this case, the pressing medium of the simulation chamber 150a may flow into the reservoir 130 through the first reservoir passage 131. In addition, even when the reaction force piston 151 moves back to the original position thereof, the pressing medium may also flow from the reservoir 130 into the simulation chamber 150a. That is, the entirety of the indoor space of the simulation chamber 150a may be fully filled with the pressing medium.

Meanwhile, the reaction force piston 151 may be arranged to partially protrude outward from the cylinder body 120, and may be provided to protrude toward the indoor space of a vehicle. Thus, the reaction force piston 151 formed to protrude toward an engine compartment is reduced in length, such that the reaction force piston 151 can be easily mounted to the vehicle.

The reaction force spring 152 and the damping member 153 are merely examples capable of supplying elastic force to the reaction force piston 151, and may also be implemented as any of other examples capable of storing elastic force by shape deformation therein as necessary. For example, the reaction force spring 152 may be formed in a coil shape, and the damping member 153 may be formed of a material such as rubber.

The support member 152 may be spaced apart from the reaction force piston 151 by a predetermined distance. As illustrated in the drawings, the support member 154 may be disposed between the piston 122 and the reaction force piston 151, and may be partially inserted into the first bore 121. As a result, the space between the piston 122 and the support member 154 may be used as the first master chamber 123a. The support member 154 may include an insertion groove 154a and a flange portion 154b. The other end of the damping member 153 may be inserted into the insertion groove 154a. The flange portion 154b may extend from the outer circumference of the support member 154 such that the flange portion 154b may support the other end of the reaction force spring 152. In a normal operation mode, movement of the support member 154 should be restricted in a manner that the reaction force spring 152 and the damping member 153 are elastically deformed by pressurization of the reaction force piston 151. In an emergency operation mode, restricted movement of the support member 154 should be released to pressurize the first master chamber 123a.

The simulation valve 157 may be provided in the simulation chamber passage 156, such that the simulation valve 157 may control flow of the pressing medium in response to the opening or closing operation thereof. Movement of the support member 154 may be controlled by the opening or closing operation of the simulation valve 157. Operation states of the support member 154 affected by the opening or closing operation of the simulation valve 157 will hereinafter be described with reference to the attached drawings.

Meanwhile, reference numeral 155 not illustrated is a closing member that is coupled to one opened part of the bore 121 to prevent the reaction force piston 151 from escaping from the cylinder body 120 as well as to seal the indoor space of the bore 121.

Referring back to FIG. 1, the electronic brake system 1 according to the embodiment of the present disclosure may include a hydraulic-pressure supply device 200, a hydraulic control unit 300, a first backup passage 351, a second backup passage 352, a cut valve 361, and an electronic control unit (ECU) (not shown). The hydraulic-pressure supply device 200 may mechanically operate by receiving an electric signal indicating the driver's braking intention from a pedal displacement sensor 111 sensing displacement of the brake pedal 110, and may thus provide hydraulic pressure of the pressing medium. The hydraulic control unit 300 may include first and second hydraulic circuits 201 and 202, each of which includes two wheels (two of RR, RL, FR, FL) and controls flow of hydraulic pressure supplied to the wheel cylinders 140 disposed in the two wheels (two of RR, RL, FR, FL). The first backup passage 351 may connect the simulation chamber 150a to the second hydraulic circuit 302. The second backup passage 352 may connect the second hydraulic port 125b to the first hydraulic circuit 301. The cut valve 361 may be disposed in the second backup passage 352 to control flow of hydraulic pressure. The ECU may control the hydraulic-pressure supply device 200 and valves 133, 157, 321a, 321b, 321c, 321d, 322a, 322b, 322c, 322d, 333, 335, 336, 343, and 344 based on hydraulic pressure information and pedal displacement information.

The hydraulic-pressure supply device 200 may include a hydraulic-pressure providing unit 210 to provide pressing-medium pressure to be supplied to wheel cylinders 140, a motor 220 to produce rotational force according to an electrical signal from the pedal displacement sensor 111, and a power switching unit 230 to convert rotational motion of the motor 220 into rectilinear motion and to provide the rectilinear motion to the hydraulic-pressure providing unit 210. Alternatively, the hydraulic-pressure providing unit 210 may operate by pressure supplied from a high-pressure accumulator, instead of by driving force supplied from the motor 220.

The hydraulic-pressure providing unit 210 may include a cylinder block 211, a hydraulic piston 214, one or more sealing members 215 (including 215a and 215b), and a drive shaft 233. The cylinder block 211 may have a pressure chamber to store the pressing medium supplied thereto. The hydraulic piston 214 may be provided in the cylinder block 211. The sealing member 215 (including 215a and 215b) may be disposed between the hydraulic piston 214 and the cylinder block 211 to seal the pressure chamber. The drive shaft 233 may be connected to the rear end of the hydraulic piston 214 to transfer power from the power switching unit 230 to the hydraulic piston 214.

The pressure chamber may include a first pressure chamber 212 located at a front side (i.e., a forward direction, see a left side of FIG. 1) of the hydraulic piston 214, and a second pressure chamber 213 located at a rear side (i.e., a backward direction, see a right side of FIG. 1) of the hydraulic piston 214. That is, the first pressure chamber 212 may be divided by the cylinder block 211 and the front end of the hydraulic piston 214, and may have a volume changeable according to movement of the hydraulic piston 214. The second pressure chamber 213 may be divided by the cylinder block 211 and the rear end of hydraulic piston 214, and may have a volume changeable according to movement of the hydraulic piston 214.

The first pressure chamber 212 may be connected to a first hydraulic passage 311 through a first communication hole formed at the front side of the cylinder block 211. The second pressure chamber 213 may be connected to a fourth hydraulic passage 314 through a second communication hole formed at the rear side of the cylinder block 211.

The first hydraulic passage 311 may connect the first pressure chamber 212 to the first and second hydraulic circuits 301 and 302. The first hydraulic passage 311 may be divided into a second hydraulic passage 312 communicating with the first hydraulic circuit 301 and a third hydraulic passage 313 communicating with the second hydraulic circuit 302. The fourth hydraulic passage 314 may connect the second pressure chamber 213 to the first and second hydraulic circuits 301 and 302. The fourth hydraulic passage 314 may be divided into a fifth hydraulic passage 315 communicating with the first hydraulic circuit 301 and a sixth hydraulic passage 316 communicating with the second hydraulic circuit 302.

The sealing member 215 may include a piston sealing member 215a and a drive-shaft sealing member 215b. The piston sealing member 215a may be disposed between the hydraulic piston 214 and the cylinder block 211 to seal a gap between the first pressure chamber 212 and the second pressure chamber 213. The drive-shaft sealing member 215b may be disposed between the drive shaft 233 and the cylinder block 211 to seal a gap between the second pressure chamber 213 and the opening of the cylinder block 211. That is, hydraulic pressure or negative pressure of the first pressure chamber 212 affected by forward or backward movement of the hydraulic piston 214 may be blocked by the piston sealing member 215a, so that the resultant hydraulic pressure or negative pressure of the first pressure chambers 212 can be transmitted to the first and fourth hydraulic passages 311 and 314 without leaking to the second pressure chamber 213. Hydraulic pressure or negative pressure of the second pressure chamber 213 affected by forward or backward movement of the hydraulic piston 214 may be blocked by the drive-shaft sealing member 215a, so that the resultant hydraulic pressure or negative pressure of the second pressure chamber 213 may not leak to the outside of the cylinder block 211.

The first pressure chamber 212 may be connected to the reservoir 130 through a first dump passage 216, such that the first pressure chamber 212 may receive the pressing medium from the reservoir 130 and store the received pressing medium or may transmit the pressing medium of the first or second pressure chamber 212 or 213 to the reservoir 130. The second pressure chamber 213 may be connected to the reservoir 130 through a second dump passage 217, such that the second pressure chamber 113 may receive the pressing medium from the reservoir 130 and store the received pressing medium or may transmit the pressing medium of the first or second pressure chamber 212 or 213 to the reservoir 130. For example, the dump passages 216 and 217 may include a first dump passage 216 that is branched from the first pressure chamber 212 and connected to the reservoir 130, and a second dump passage 217 that is branched from the second pressure chamber 213 and connected to the reservoir 130.

The first hydraulic passage 311 may be divided into the second hydraulic passage 312 and the third hydraulic passage 313 so that first hydraulic passage 311 may communicate with both the first hydraulic circuit 301 and the second hydraulic circuit 302. For example, the second hydraulic passage 312 may communicate with the first hydraulic circuit 301, and the third hydraulic passage 313 may communicate with the second hydraulic circuit 302. Therefore, hydraulic pressure may be transmitted to the first and second hydraulic circuits 301 and 302 by forward movement of the hydraulic piston 214.

The electronic brake system 1 according to the embodiment of the present disclosure may include a first control valve 331 that is provided in the second hydraulic passage 312 to control flow of the pressing medium, and a second control valve 332 that is provided in the third hydraulic passage 313 to control flow of the pressing medium.

The first or second control valve 331 or 332 may be implemented as a check valve that allows the pressing medium to flow from the first pressure chamber 212 to the first or second hydraulic circuit 301 or 302 and prevents the pressing medium from flowing from the first or second hydraulic circuit 301 or 302 to the first pressure chamber 212. That is, the first or second control valve 331 or 332 may allow hydraulic pressure of the first pressure chamber 212 to flow into the first or second hydraulic circuit 201 or 202, and may prevent hydraulic pressure of the first or second hydraulic circuit 301 or 302 from leaking to the first pressure chamber 212 through the second or third hydraulic passage 312 or 313.

Meanwhile, the fourth hydraulic passage 314 may be divided into the fifth hydraulic passage 315 and the sixth hydraulic passage 316 so that the fourth hydraulic passage 314 may communicate with both the first hydraulic circuit 301 and the second hydraulic circuit 302. For example, the fifth hydraulic passage 315 branched from the fourth hydraulic passage 314 may communicate with the first hydraulic circuit 301, and the sixth hydraulic passage 316 branched from the fourth hydraulic passage 314 may communicate with the second hydraulic circuit 302. Therefore, by backward movement of the hydraulic piston 314, hydraulic pressure may be transmitted to both the first hydraulic circuit 301 and the second hydraulic circuit 302.

The electronic brake system 1 according to the embodiment of the present disclosure may include a third control valve 333 embedded in the fifth hydraulic passage 315 to control flow of the pressing medium, and a fourth control valve 334 embedded in the sixth hydraulic passage 316 to control flow of the pressing medium.

The third control valve 333 may be implemented as a bidirectional control valve to control flow of the pressing medium between the first hydraulic circuit 301 (or the second hydraulic circuit 302) and the second pressure chamber 213. The third control valve 333 may be implemented as a normally closed (NC) solenoid valve that remains closed in a normal state and is then open upon receiving an opening signal from the ECU.

The fourth control valve 334 may be implemented as a check valve that allows the pressing medium to flow from the second pressure chamber 213 to the second hydraulic circuit 302 and prevents the pressing medium from flowing from the second hydraulic circuit 302 to the second pressure chamber 213. That is, the fourth control valve 334 may prevent hydraulic pressure of the second hydraulic circuit 302 from leaking to the second pressure chamber 213 through the sixth hydraulic passage 316 and the fourth hydraulic passage 314.

The electronic brake system 1 according to the embodiment of the present disclosure may include a fifth control valve 335 provided in the seventh hydraulic passage 317 interconnecting the second hydraulic passage 312 and the third hydraulic passage 313 so as to control flow of the pressing medium, and a sixth control valve 336 provided in the eighth hydraulic passage 318 interconnecting the second hydraulic passage 312 and the seventh hydraulic passage 317 so as to control flow of the pressing medium. In this case, the seventh hydraulic passage 317 may be connected to the fifth hydraulic passage 315. The fifth control valve 335 and the sixth control valve 336 may be implemented as normally closed (NC) solenoid valves that remain closed in a normal state and then opened upon receiving an opening signal from the ECU.

When the first control valve 331 or the second control valve 332 abnormally operates, the fifth control valve 335 and the sixth control valve 336 are opened such that hydraulic pressure of the first pressure chamber 212 can flow into both the first hydraulic circuit 301 and the second hydraulic circuit 302.

The fifth control valve 335 and the sixth control valve 336 may be opened when hydraulic pressure of the wheel cylinders 140 flows into the first pressure chamber 212, because the first control valve 331 provided in the second hydraulic passage 312 and the second control valve 332 provided in the third hydraulic passage 313 are implemented as check valves for allowing the pressing medium to flow only in one direction.

Meanwhile, the electronic brake system 1 according to the embodiment of the present disclosure may include a first dump valve 341 provided in the first dump passage 216 to control flow of the pressing medium, and a second dump valve 342 provided in the second dump passage 217 to control flow of the pressing medium. The first dump valve 341 may be implemented as a check valve that allows the pressing medium to flow from the reservoir 130 to the first pressure chamber 212 and prevents the pressing medium from flowing from the first pressure chamber 212 to the reservoir 130. The second dump valve 342 may be implemented as a check valve that allows the pressing medium to flow from the reservoir 130 to the second pressure chamber 213 and prevents the pressing medium from flowing from the second pressure chamber 213 to the reservoir 130.

That is, the first dump valve 341 may be implemented as a check valve that allows the pressing medium to from the reservoir 130 to the first pressure chamber 212 and prevents the pressing medium from flowing from the first pressure chamber 212 to the reservoir 130. The second control valve 342 may be implemented as a check valve that allows the pressing medium to flow from the reservoir 130 to the second hydraulic chamber 213 and prevents the pressing medium from flowing from the second hydraulic chamber 213 to the reservoir 130.

Each of the first dump passage 216 and the second dump passage 217 may include a bypass passage. A third dump valve 343 to control flow of the pressing medium between the first pressure chamber 212 and the reservoir 130 may be provided in the bypass passage formed in the first dump passage 216. A fourth ump valve 344 to control flow of the pressing medium between the second pressure chamber 213 and the reservoir 130 may be provided in the bypass passage formed in the second dump passage 217.

Each of the third dump valve 343 and the fourth dump valve 344 may be implemented as a bidirectional solenoid valve to control bidirectional flow of the pressing medium. Each of the third and fourth dump valves 343 and 344 may be implemented as a normally open (NO) solenoid valve that remains opened in a normal state and then closed upon receiving a closing signal from the ECU.

Meanwhile, the hydraulic-pressure providing unit 210 of the electronic brake system 1 according to the embodiment of the present disclosure may operate in a double-acting manner.

That is, hydraulic pressure produced in the first pressure chamber 212 by forward movement of the hydraulic piston 214 may be transmitted to the first hydraulic circuit 301 through the first hydraulic passage 311 and the second hydraulic passage 312, thereby operating the wheel cylinders 140 installed in the front right wheel FR and the rear left wheel RL. In addition, hydraulic pressure produced in the first pressure chamber 112 by forward movement of the hydraulic piston 214 may be transmitted to the second hydraulic circuit 302 through the first hydraulic passage 311 and the third hydraulic passage 313, thereby operating the wheel cylinders 140 installed in the rear right wheel RR and the front left wheel FL.

Likewise, hydraulic pressure produced in the second pressure chamber 213 by backward movement of the hydraulic piston 214 may be transmitted to the first hydraulic circuit 301 through the fourth hydraulic passage 314 and the fifth hydraulic passage 315, thereby operating the wheel cylinders 140 installed in the front right wheel FR and the rear left wheel RL. In addition, hydraulic pressure produced in the second pressure chamber 213 by backward movement of the hydraulic piston 214 may be transmitted to the second hydraulic circuit 302 through the fourth hydraulic passage 314 and the sixth hydraulic passage 316, thereby operating the wheel cylinders 140 installed in the rear right wheel RR and the front left wheel FL.

Negative pressure produced in the first pressure chamber 212 by backward movement of the hydraulic piston 214 may suction the pressing medium from the wheel cylinders 140 installed in the front right wheel FR and the rear left wheel RL, and may transmit the suctioned pressing medium to the first pressure chamber 212 through the first hydraulic circuit 301, the seventh hydraulic passage 317, the eighth hydraulic passage 318, and the first hydraulic passage 311. In addition, negative pressure produced in the first pressure chamber 212 by backward movement of the hydraulic piston 114 may suction the pressing medium from the wheel cylinders 140 installed in the rear right wheel RR and the front left wheel FL, and may transmit the suctioned pressing medium to the first pressure chamber 212 through the second hydraulic circuit 302, the third hydraulic passage 313, the seventh hydraulic passage 317, and the eighth hydraulic passage 318.

The motor 220 and the power switching unit 230 of the hydraulic-pressure supply device 200 will hereinafter be described.

The motor 220 including a stator 221 and a rotor 222 therein may produce rotational force according to an output signal of the ECU (not shown), and may produce rotational force in a forward or backward direction. A rotational angular speed and a rotation angle of the motor 220 may be precisely controlled. The motor 220 is well known to those skilled in the art, and as such a detailed description thereof will herein be omitted for convenience of description.

The ECU may control the motor 220 and valves 133, 157, 321a, 321b, 321c, 321d, 322a, 322b, 322c, 322d, 333, 335, 336, 343, and 344 included in the electronic brake system 1 to be described later.

Driving force of the motor 220 may generate displacement of the hydraulic piston 214 through the power switching unit 230. Hydraulic pressure generated by the hydraulic piston 214 slidably moving within the pressure chamber may be transmitted to the wheel cylinders 40 respectively installed at the wheels RR, RL, FR, and FL through the first and fourth hydraulic passages 311 and 314.

The power switching unit 230 may convert rotational force into rectilinear movement. For example, the power switching unit 230 may include a worm shaft 231, a worm wheel 232, and a drive shaft 233.

The worm shaft 231 may be integrated with a rotational shaft of the motor 220. At least one worm may be formed at the outer circumference of the worm shaft 231 in a manner that the worm shaft 231 is meshed with the worm wheel 232 so that the worm wheel 232 can rotate. The worm wheel 232 may be meshed with the drive shaft 233 so that the drive shaft 233 performs rectilinear motion. The drive shaft 233 is connected to the hydraulic piston 214, such that the hydraulic piston 214 may slidably move within the cylinder block 211.

In more detail, a signal sensed by the pedal displacement sensor 111 due to displacement of the brake pedal 110 may be transmitted to the ECU (not shown), and the ECU may operate the motor 220 in one direction so that the worm shaft 231 may also rotate in one direction. Rotational force of the worm shaft 231 may be transmitted to the drive shaft 233 through the worm wheel 232, and the hydraulic piston 214 connected to the drive shaft 233 moves forward, so that hydraulic pressure occurs in the first pressure chamber 212.

In contrast, when a pedal effort is removed from the brake pedal 110, the ECU may operate the motor 220 in an opposite direction so that the worm shaft 231 may also rotate in the opposite direction. Accordingly, the worm wheel 232 may also rotate in the opposite direction, and the hydraulic piston 214 connected to the drive shaft 233 moves back to the original position thereof (by backward movement), thereby generating negative pressure in the first pressure chamber 212.

Meanwhile, hydraulic pressure and negative pressure may also occur in other directions opposite to the above-mentioned directions as necessary. In other words, a signal sensed by the pedal displacement sensor 111 due to displacement of the brake pedal 110 may be transmitted to the ECU, and the ECU may operate the motor 220 in an opposite direction so that the worm shaft 231 may also rotate in the opposite direction. Rotational force of the worm shaft 231 may be transmitted to the drive shaft 233 through the worm wheel 232, and the hydraulic piston 214 connected to the drive shaft 233 moves backward, so that hydraulic pressure occurs in the second pressure chamber 213.

In contrast, when a pedal effort is removed from the brake pedal 110, the ECU may operate the motor 220 in one direction so that the worm shaft 231 may also rotate in one direction. Accordingly, the worm wheel 232 may also rotate in the opposite direction, and the hydraulic piston 214 connected to the drive shaft 233 moves back to the original position thereof (by forward movement), thereby generating negative pressure in the second pressure chamber 213.

As described above, the hydraulic-pressure supply device 200 may transmit or suction hydraulic pressure to or from the wheel cylinders 140 according to a rotation direction of rotational force produced by the motor 220, such that the resultant hydraulic pressure may be transferred to the reservoir 130.

Meanwhile, when the motor 220 rotates in one direction, hydraulic pressure may occur in the first pressure chamber 212 or negative pressure may occur in the second pressure chamber 213. Information as to whether to brake the vehicle using hydraulic pressure or information as to whether to release braking using negative pressure may be determined by controlling the valves 133, 157, 321a, 321b, 321c, 321d, 322a, 322b, 322c, 322d, 333, 335, 336, 343, and 344.

Although not shown in the drawings, the power switching unit 230 may also be formed of a ball-screw-nut assembly. For example, the power switching unit 230 may include a screw that is integrated with a rotational shaft of the motor 220 or rotates with the rotational shaft of the motor 220, and a ball nut that is screw-coupled to the screw in a restricted rotation state and performs rectilinear motion according to rotation of the screw. The hydraulic piston 214 may be connected to the ball nut of the power switching unit 230, and may pressurize the pressure chamber by rectilinear movement of the ball nut. The above-mentioned ball-screw-nut assembly to convert rotational force into rectilinear motion is well known to those skilled in the art, and as such a detailed description thereof will herein be omitted.

In addition, the power switching unit 230 may be implemented not only as the ball-screw-nut assembly, but also as any structure capable of converting rotational force into rectilinear motion without departing from the scope and spirit of the present disclosure.

The electronic brake system 1 according to the embodiment of the present disclosure may further include first and second backup passages 351 and 352 that are capable of directly supplying the pressing medium discharged from the master cylinder 100 to the wheel cylinders 140 during an abnormal or faulty operation of the electronic brake system 1.

When the first control valve 331 or the second control valve 332 abnormally operates, the fifth control valve 335 and the sixth control valve 336 are opened such that hydraulic pressure of the first pressure chamber 212 can flow into both the first hydraulic circuit 301 and the second hydraulic circuit 302. The above-mentioned operation mode in which hydraulic pressure of the master cylinder 100 is directly transmitted to the wheel cylinders 140 will hereinafter be referred to as a fallback mode.

As described above, the first backup passage 351 may connect the simulation chamber 150a to downstream sides of the outlet valves 332c and 332d of the second hydraulic circuit 302, and the second backup passage 352 may connect the second hydraulic port 125b to the inlet valves 321a and 321b and the outlet valves 332a and 332b of the first hydraulic circuit 301. The first backup passage 351 may be branched from the first reservoir passage 131 interconnecting the simulation chamber 150a and the reservoir 130, and the second backup passage 352 may be provided with the cut valve 361. In this case, hydraulic pressure produced in the first master chamber 123a of the master cylinder 100 may not be directly transmitted to the first backup passage 351, and may be transmitted to the first backup passage 351 through the simulation chamber 150a. As a result, an additional cut valve need not be installed in the first backup passage 351, such that the number of cut valves is greatly reduced as compared to the conventional art.

The hydraulic control unit 300 may include a first hydraulic circuit 301 to control two wheels upon receiving hydraulic pressure, and a second hydraulic circuit 302 to control the two other wheels upon receiving hydraulic pressure. For example, the first hydraulic circuit 301 may control the front right wheel FR and the rear left wheel RL. The second hydraulic circuit 302 may control the front left wheel FL and the rear right wheel RR. The wheel cylinders 140 may be respectively installed in the four wheels FR, FL, RR, and RL, such that the wheel cylinders 140 may receive hydraulic pressure from the hydraulic-pressure supply device 200, resulting in braking of the vehicle.

The first hydraulic circuit 301 may be connected to the first hydraulic passage 311 and the second hydraulic passage 312 so as to receive hydraulic pressure from the hydraulic-pressure supply device 200, and the second hydraulic passage 312 may be divided into two passages that are respectively connected to the front right wheel FR and the rear left wheel RL. Likewise, the second hydraulic circuit 302 may be connected to the first hydraulic passage 311 and the third hydraulic passage 313 so as to receive hydraulic pressure from the hydraulic-pressure supply device 200, and the third hydraulic passage 313 may be divided into two passages that are respectively connected to the front left wheel FL and the rear right wheel RR.

Each of the first and second hydraulic circuits 301 and 302 may include a plurality of inlet valves 321 (321a, 321b, 321c, 321d) to control flow of hydraulic pressure. The plurality of inlet valves 321 (321a, 321b, 321c, 321d) may include the first, second, third, and fourth inlet valves 321a, 321b, 321c, and 321d that respectively control hydraulic pressures flowing into the wheel cylinders 140 respectively mounted to the wheels RR, RL, FR, and FL. For example, the first hydraulic circuit 301 may be provided with the first and second inlet valves 321a and 321b connected to the second hydraulic passage 312 such that the first and second inlet valves 321a and 321b may respectively control hydraulic pressures applied to two wheel cylinders 140. The second hydraulic circuit 302 may be provided with the third and fourth inlet valves 321c and 321d connected to the third hydraulic passage 313 such that the third and fourth inlet valves 321c and 321d may respectively control hydraulic pressures applied to the wheel cylinders 140.

The inlet valves 321 may be arranged upstream of the wheel cylinders 140. The inlet valves 321 may be implemented as normally open (NO) solenoid valves that remain opened in a normal state and then closed upon receiving a closing signal from the ECU.

The first and second hydraulic circuits 301 and 302 may include check valves 323a, 323b, 323c, and 323d provided in bypass passages by which front ends and rear ends of the respective inlet valves 321a, 321 b, 321c, and 321d are connected to each other. The check valves 323a, 323b, 323c, and 323d may allow the pressing medium I to flow from the wheel cylinders 140 to the hydraulic-pressure providing unit 210 and prevents the pressing medium from flowing from the hydraulic-pressure providing unit 210 to the wheel cylinders 140. The check valves 323a, 323b, 323c, and 323d may allow brake pressure of the wheel cylinders 140 to be rapidly discharged. Alternatively, during abnormal operation of the inlet valves 321a, 321b, 321c, and 321d, the check valves 323a, 323b, 323c, and 323d may allow hydraulic pressure of the wheel cylinders 140 to flow into the hydraulic-pressure providing unit 210.

The first and second hydraulic circuits 301 and 302 may further include a plurality of outlet valves 322 (322a, 322b, 322c, 322d) connected to the reservoir 130 so as to improve performance or throughput when braking is released. The outlet valves 322 may include the first, second, third, and fourth outlet valves 322a, 322b, 322c, and 322d that are respectively connected to the wheel cylinders 40 so as to control hydraulic pressures discharged from the respective wheels RR, RL, FR, and FL. That is, the first, second, third, and fourth outlet valves 322a, 322b, 322c, and 322d may sense brake pressures of the respective wheels RR, RL, FR, and FL. If decompression braking is needed, the first, second, third, and fourth outlet valves 322a, 322b, 322c, and 322d may be selectively opened to control pressure.

For example, the first hydraulic circuit 301 may include the first and second outlet valves 322a and 322b that respectively control hydraulic pressures applied to two wheel cylinders 140. The first and second outlet valves 322 may be implemented as normally closed (NC) solenoid valves that remain closed in a normal state and then opened upon receiving an opening signal from the ECU.

The second hydraulic circuit 302 may include the third and fourth outlet valves 322c and 322d connected to the reservoir 130 through the first backup passage 351 and the first reservoir passage 131, such that the third and fourth outlet valves 322c and 322d may respectively control hydraulic pressures applied to the wheel cylinders 140. Each of the third and fourth outlet valves 322c and 322d may be implemented as a normally open (NO) solenoid valve that remains opened in a normal state and then closed upon receiving a closing signal from the ECU.

The hydraulic control unit 300 may be connected to the backup passages 351 and 352. For example, the first hydraulic circuit 301 may be connected to the second backup passage 352 so as to receive hydraulic pressure from the master cylinder 100, and the second hydraulic circuit 302 may be connected to the first backup passage 351 so as to receive hydraulic pressure from the master cylinder 100.

In this case, the first backup passage 351 may be linked to the second hydraulic circuit 302 at downstream sides of the third and fourth outlet valves 322a and 322b, and the second backup passage 352 may be linked to the first hydraulic circuit 301 at downstream sides of the first and second inlet valves 321a and 322b.

Therefore, hydraulic pressure supplied from the hydraulic-pressure supply device 200 when the cut valves 361 are closed may be supplied to the wheel cylinders 140 through the first and second hydraulic circuits 301 and 302. Hydraulic pressure supplied from the master cylinder 100 when the cut valves 361 are opened and the inspection valve 133 is closed may be supplied to the wheel cylinders 140 through the first and second backup passages 351 and 352. In this case, the plurality of inlet valves 321a, 321b, 321c, and 321d and the third and fourth outlet valves 322c and 322d remain opened, so that operation states of the inlet valves 321a, 321b, 321c, and 321d and the outlet valves 322c and 322d need not be changed.

Meanwhile, reference numeral 'PS1' not illustrated is a backup-passage pressure sensor to sense pressing-medium pressure of the master cylinder 100. Reference numeral 'PS2' not illustrated is a hydraulic-passage pressure sensor to measure hydraulic pressure of the hydraulic circuit 301 or 302, and reference numeral 'MPS' not illustrated is a motor control sensor to control either a rotation angle of the motor 220 or a current of the motor 220.

In accordance with one aspect of the present disclosure, during normal operation of the electronic brake system 1, the electronic brake system 1 may detect pedal displacement corresponding to a pedal effort applied to the brake pedal 110, such that the hydraulic-pressure supply device 200 may transmit the detected hydraulic pressure to the wheel cylinders 140. In contrast, in order to stably perform braking of the vehicle during abnormal operation of the hydraulic-pressure supply device 200, the electronic brake system 1 may transmit hydraulic pressure supplied from the master cylinder 100 to the wheel cylinders 140. The above-mentioned operation mode in which hydraulic pressure supplied from the master cylinder 100 is transmitted to the wheel cylinders 140 will hereinafter be referred to as a fallback mode.

An exemplary operation state in which the electronic brake system 1 normally driven provides brake pressure to the wheel cylinders 140 will hereinafter be described with reference to the attached drawings.

Figure 3:
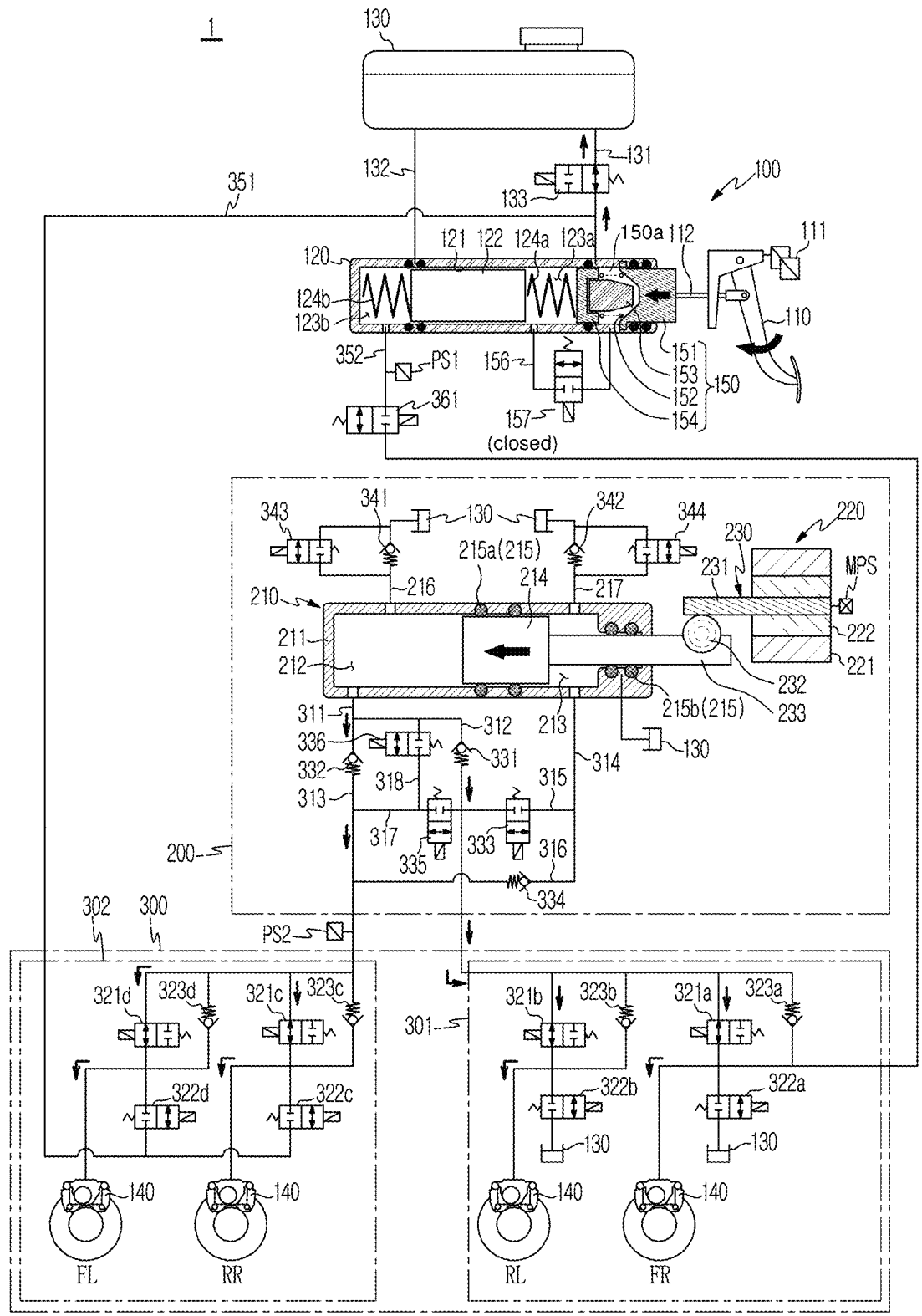
FIG. 3 is a hydraulic circuit diagram illustrating an operation state of the electronic brake system that is normally driven to provide brake pressure according to an embodiment of the present disclosure.

FIG. 3 is a hydraulic circuit diagram illustrating an operation state of the electronic brake system that is normally driven to provide brake pressure according to an embodiment of the present disclosure.

Referring to FIG. 3, when the driver depresses the brake pedal 110 in the initial braking stage, the hydraulic-pressure supply device 200 may start operation upon receiving an electrical signal from the pedal displacement sensor 111 detecting a displacement of the brake pedal 110. That is, the motor 220 may rotate in one direction, rotational force of the motor 220 may be transmitted to the hydraulic-pressure providing unit 210 by the power switching unit 230, the hydraulic piston 214 of the hydraulic-pressure providing unit 210 moves forward, such that hydraulic pressure may occur in the first pressure chamber 212. Hydraulic pressure discharged from the first pressure chamber 212 may be transmitted to the wheel cylinders 140 respectively provided to four wheels through the first hydraulic circuit 301 and the second hydraulic circuit 3202, such that braking force occurs in the wheel cylinders 140.

In more detail, hydraulic pressure supplied from the first pressure chamber 212 may be directly transmitted to the wheel cylinders 140 provided in the first hydraulic circuit 301 through the first hydraulic passage 311 and the second hydraulic passage 312. In this case, the first and second inlet valves 321a and 322b respectively installed in two passages branched from the first hydraulic circuit 301 may remain open, and the first and second outlet valves 322a and 322b installed in passages branched from two passages branched from the first hydraulic circuit 301 may remain closed, such that hydraulic pressure is prevented from leaking to the reservoir 130.

In addition, hydraulic pressure supplied from the first pressure chamber 212 may be directly transmitted to the wheel cylinders 140 provided in the second hydraulic circuit 302 through the first hydraulic passage 311 and the third hydraulic passage 313. In this case, the third and fourth inlet valves 321c and 322d respectively installed in two passages branched from the second hydraulic circuit 302 may remain open, and the third and fourth outlet valves 322c and 322d installed in passages branched from two passages branched from the second hydraulic circuit 302 may transition from the open state to the closed state, such that hydraulic pressure is prevented from leaking to the reservoir 130.

Further, the fifth control valve 335 and the sixth control valve 33 may transition to the open state, such that the seventh hydraulic passage 317 and the eighth hydraulic passage 318 may be open. Since the seventh hydraulic passage 317 and the eighth hydraulic passage 318 are opened, hydraulic pressure supplied from the first pressure chamber 212 may sequentially pass through the first hydraulic passage 311, the eighth hydraulic passage 318, and the seventh hydraulic passage 317, and may be transmitted to the first hydraulic circuit 301 and the second hydraulic circuit 302 after passing through the second hydraulic passage 312 and the third hydraulic passage 313.

In this case, during abnormal operation of the first and second control valves 331 and 332, the fifth and sixth control valves 335 and 336 may be controlled. In addition, the fifth and sixth control valves 335 and 336 may be selectively controlled to acquire a rapid braking response in the initial braking stage.

In addition, when hydraulic pressure of brake fluid occurs by the hydraulic-pressure supply device 200, the first and second backup passages 351 and 352 may be closed to prevent hydraulic pressure discharged from the master cylinder 100 from flowing into the wheel cylinders 140. That is, the simulation valve 150a and the cut valve 361 may transition to the closed state and the inspection valve 133 may transition to the open state. Therefore, the first and second master chambers 123a and 123b may be implemented as a closed circuit, and hydraulic pressure produced in the simulation chamber 150a may be transmitted to the reservoir 130 through the inspection valve 133 by the pedal simulator 150 that operates in response to a pedal effort applied to the brake pedal 110.

Figure 4:
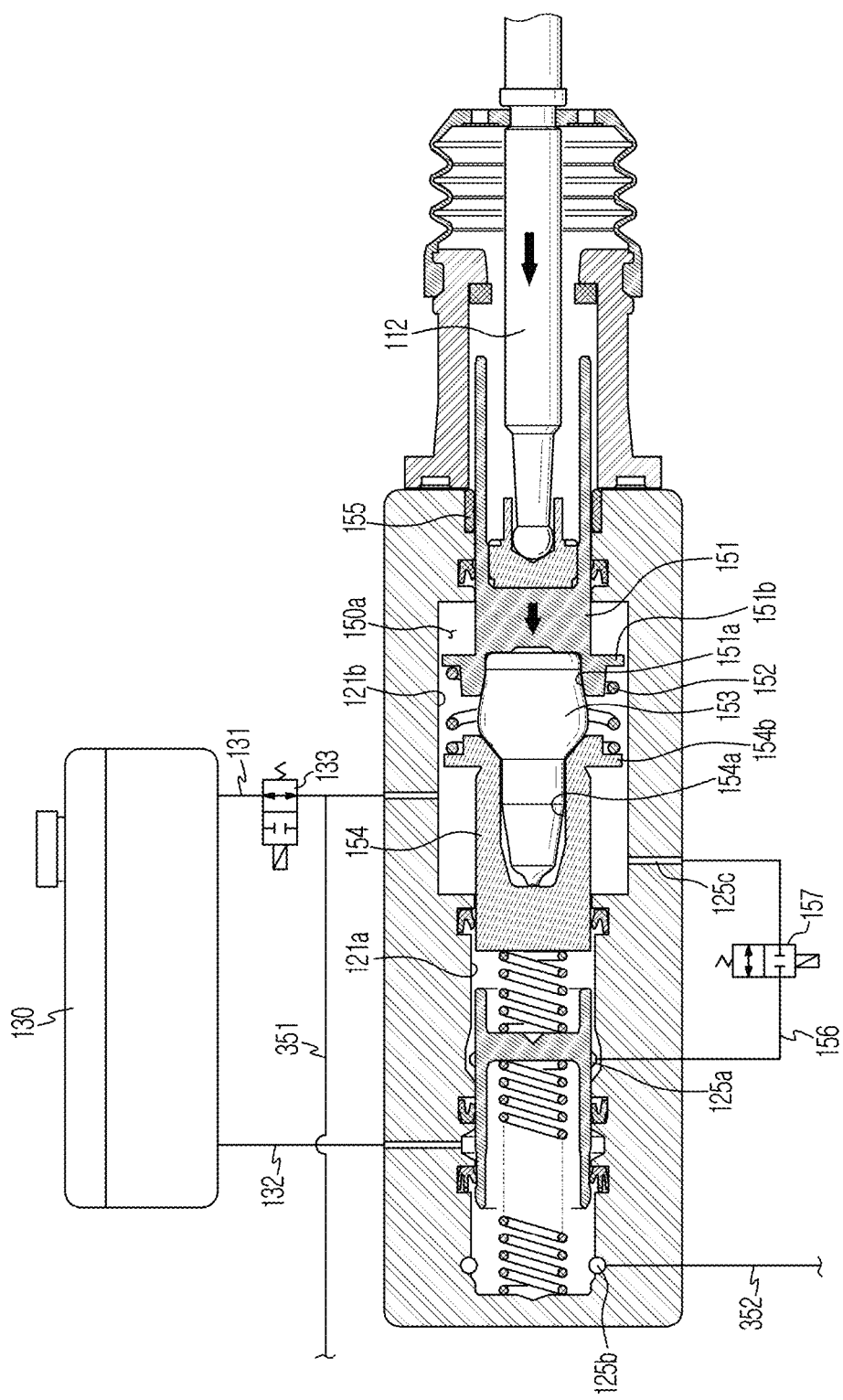
FIG. 4 is an enlarged view illustrating operation states of a master cylinder and a pedal simulator based on the operation result of FIG. 3 according to an embodiment of the present disclosure.

Meanwhile, the pedal simulator 150 configured to provide reaction force by directly receiving a pedal effort applied to the brake pedal 110 may be provided in a manner that movement of the support member 154 is fixed because the first master chamber 123a is configured as a closed circuit. As a result, as can be seen from FIG. 4, the reaction force piston 152 pressurized by a pedal effort applied to the brake pedal 110 moves forward in a manner that the reaction force spring 152 is compressed and at the same time the damping member 153 is also pressurized, such that the reaction force spring 152 and the damping member 153 may be elastically deformed by such pressurization. That is, reaction force corresponding to a pedal effort of the brake pedal 110 may occur not only by elastic restoring force produced by compression of the reaction force spring 152, but also by elastic restoring force of the damping member 153, resulting in formation of proper pedal feel for the driver.

The passage pressure sensor PS2 for sensing hydraulic pressure of at least one of the first hydraulic circuit 301 and the second hydraulic circuit 302 may sense hydraulic pressure applied to wheel cylinders 140, and may control the hydraulic-pressure supply device 200 based on the sensed hydraulic pressure, such that the amount or hydraulic pressure of the brake fluid applied to the wheel cylinders 140 can be controlled. In addition, if hydraulic pressure applied to the wheel cylinders 140 is higher than a target pressure value corresponding to the pedal effort of the brake pedal 110, at least one of the first to fourth outlet valves 322 is open such that the resultant hydraulic pressure may be controlled to correspond to the target pressure value.

An exemplary operation state in which the electronic brake system 1 provides brake pressure in a fallback mode during abnormal operation of the electronic brake system 1 will hereinafter be described with reference to FIG. 5.

Figure 5:
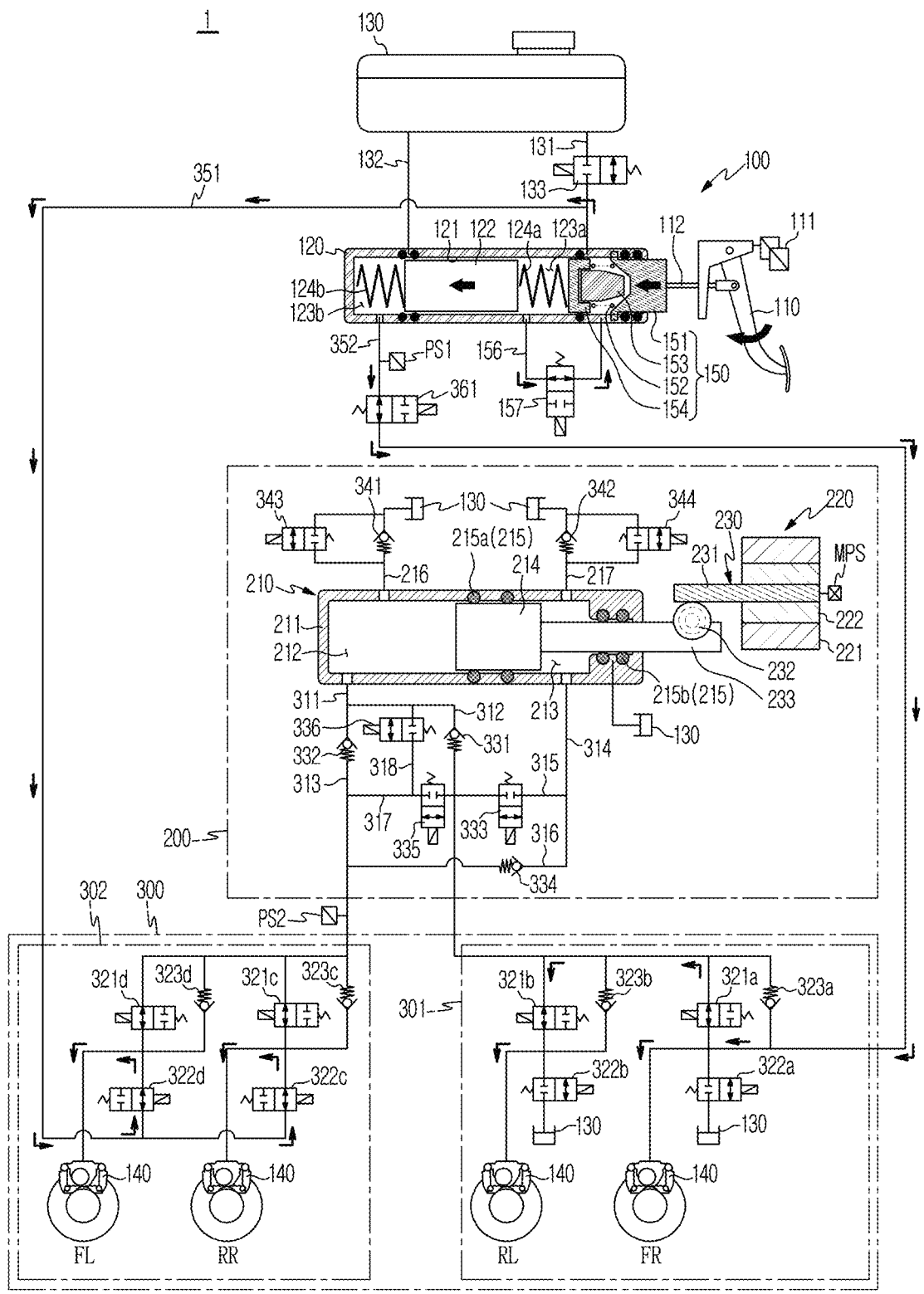
FIG. 5 is a hydraulic circuit diagram illustrating an operation state of the electronic brake system that is abnormally driven and thus provides brake pressure in a fallback mode according to an embodiment of the present disclosure.

Referring to FIG. 5, when the driver depresses the brake pedal 110 in the initial braking stage, the pedal simulator 150 that is in direct directly contacting the input rod 112 coupled to the brake pedal 110 may move forward and at the same time the piston 112 may also move forward. That is, the first master chamber 123a may be pressurized by the pedal simulator 150 such that hydraulic pressure can be discharged from the first master chamber 123a, and the second master chamber 123b is pressurized by the piston 122 such that hydraulic pressure can be discharged from the second master chamber 123b. In this case, the simulation valve 157 is open, and the reaction force spring 152 and the damping member 153 of the pedal simulator 150 may transmit pressing force to the support member 152 without being compressed, such that the support member 154 may move toward the first bore 121a to transmit a pedal effort to the piston 122.

Hydraulic pressure discharged from the master cylinder 100 may be transmitted to the wheel cylinders 140 through the first and second backup passages 351 and 352 connected for backup braking, resulting in formation of brake force. In this case, hydraulic pressure discharged from the first master chamber 123a may be transmitted to the first backup passage 351 through the simulation chamber 150a.

In more detail, the inspection valve 133 provided in the first reservoir passage 131 connected to the first backup passage 351 may be implemented as a normally closed (NC) solenoid valve that remains closed in a normal state, such that hydraulic pressure discharged from the simulation chamber 150a may directly flow into the second hydraulic circuit 302. In this case, each of the third and fourth outlet valves 322c and 322d provided in the second hydraulic circuit 302 may be implemented as a normally open (NO) solenoid valve that remains open in a normal state, such that hydraulic pressure received through the first backup passage 351 may be transmitted to the wheel cylinders 140 of the front left wheel FL and the rear right wheel RR through the third and fourth outlet valves 322c and 322d.

In addition, the cut valve 361 connected to the second backup passage 352 is implemented as a normally open (NO) solenoid valve that remains open in a normal state, such that hydraulic pressure can be directly transmitted to the wheel cylinders 140. In this case, each of the first and second outlet valves 322a and 322b provided in the first hydraulic circuit 301 is implemented as a normally closed (NC) solenoid valve that remains closed in a normal state, such that hydraulic pressure is prevented from leaking to the reservoir 130.

In addition, each of the first, second, and fourth control valves 331, 332, and 334 connected to the hydraulic circuit 301 and 302 may be provided as a check valve that allows the pressing medium to flow into the hydraulic circuits 301 and 302 only, and each of the third, fifth, and sixth control valves 333, 335, and 336 may be implemented as a normally closed (NC) solenoid valve, such that hydraulic pressure applied to the wheel cylinders 140 is prevented from leaking to the hydraulic-pressure providing unit 210.

The flowing direction of the pressing medium for use in a decompression state of the above-mentioned fallback mode may be opposite to the flowing direction of the pressing medium for use in a pressurization state of the fallback mode. For example, hydraulic pressure discharged from the wheel cylinders 140 of the first hydraulic circuit 301 may flow into the second master chamber 123b after passing through the second backup passage 352 and the cut valve 361. Hydraulic pressure discharged from the wheel cylinders 140 of the second hydraulic circuit 302 may sequentially pass through the third and fourth outlet valves 322c and 322d, the first backup passage 351, the first reservoir passage 313, and the simulation chamber 150a, and may thus finally flow into the first master chamber 123a.

Meanwhile, the aforementioned fallback mode may refer to an operation mode in which the hydraulic-pressure supply device 200 abnormally operates. In the fallback mode, although the entire electronic brake system 1 is shut down or fails in operation, the electronic brake system according to the embodiment of the present disclosure may enable the pressing medium to flow in the same direction as in the fallback mode such that hydraulic pressure is transmitted to the respective wheel cylinders.

As is apparent from the above description, the master cylinder and the electronic brake system including the same according to the embodiments of the present disclosure may allow a piston of the master cylinder to be connected in series to a pedal simulator, may allow at least one spring and at least one damping member configured to provide reaction force to be arranged in parallel to each other, resulting in minimum increase in the length of the master cylinder. In addition, the pedal simulator is located at the outermost part of the master cylinder in a manner that the pedal simulator can be directly coupled to a brake pedal, such that a fabrication and assembling process of the electronic brake system becomes more simplified and facilitated.

The pedal simulator is mounted to the master cylinder, resulting in reduction in a product size.

In addition, a connection structure of flow passages is simplified and the number of valves is greatly reduced as compared to the conventional art, such that product costs are reduced and productivity is increased.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A master cylinder for an electronic brake system in which the master cylinder includes a cylinder body connected to a reservoir and provided with a bore, one end of which is opened in a longitudinal direction, a piston configured to be movable forward and backward within the bore, and at least one master chamber configured to discharge a pressing medium in response to a displacement of the piston, the master cylinder comprising:
   a pedal simulator provided in the bore, spaced apart from the piston, and configured to provide reaction force in response to pressure from a brake pedal;
   a simulation chamber formed in the bore, the simulation chamber separated from the master chamber by the pedal simulator;
   a simulation passage connecting the simulation chamber to the master chamber; and
   a simulation valve provided in the simulation passage, and configured to control flow of the pressing medium in response to an opening/closing operation thereof,
   wherein when the electronic brake system normally operates, the simulation valve is closed to prevent the pressing medium from flowing between the master chamber and the simulation chamber in a manner that movement of the piston is restricted and the pedal simulator operates such that the simulation valve receives reaction force.

2. The master chamber according to claim 1, wherein the pedal simulator includes:
   a reaction force piston configured to be slidably movable within the bore, and be directly pressurized by the brake pedal;
   a damping member provided in contact with the reaction force piston, and configured be pressed and provide reaction force in response to movement of the reaction force piston; and
   a support member spaced apart from the reaction force piston so as to support the damping member.

3. The master chamber according to claim 2, wherein the pedal simulator further includes:

a reaction force spring supported by the support member, and configured to provide reaction force after being pressurized in response to movement of the reaction force piston.

4. The master chamber according to claim 3, wherein the reaction force piston includes:
a coupling groove in which one end of the damping member is inserted; and
an extension portion extending from an outer circumference of the reaction force piston, and configured to support one end of the reaction force spring.

5. The master chamber according to claim 4, wherein the support member includes:
an insertion groove in which other end of the damping member is inserted; and
a flange portion extending from an outer circumference of the support member, and supporting other end of the reaction force spring.

6. The master cylinder according to claim 1, wherein:
when the electronic brake system abnormally operates (i.e., fallback mode), the simulation valve is open to allow the pressing medium to flow between the master chamber and the simulation chamber in a manner that the piston moves from the pedal simulator while being in press contact with the pedal simulator, and the pressing medium contained in the master chamber is transmitted to at least one wheel cylinder installed in at least one wheel after passing through the simulation chamber.

7. The master chamber according to claim 1, wherein the bore includes:
a first bore formed in a manner that the piston is movable forward and backward therein, resulting in formation of the master chamber; and
a second bore, a diameter of which is longer than that of the first bore, configured to form the simulation chamber.

8. An electronic brake system comprising:
a master cylinder including:
a cylinder body connected to a reservoir, the cylinder body having a bore, one end of which is opened in a longitudinal direction,
a piston configured to be movable forward and backward within the bore,
first and second master chambers respectively formed in bores located at front and rear sides of the piston, and configured to discharge a pressing medium;
a pedal simulator provided in a bore, spaced apart from the piston, and configured to provide reaction force in response to pressure from a brake pedal,
a simulation chamber separated from the first master chamber by the pedal simulator, the simulation chamber formed in the bore,
a simulation passage configured to connecting the simulation chamber to the first master chamber, and
a simulation valve provided in the simulation passage, and configured to control flow of the pressing medium in response to an opening/closing operation thereof;
a hydraulic-pressure supply device configured to operate by an electrical signal of a pedal displacement sensor detecting a displacement of the brake pedal;
a hydraulic control unit provided with first and second hydraulic circuits, each of which controls flow of hydraulic pressure applied to wheel cylinders installed in wheels by controlling hydraulic pressure discharged from the master cylinder or the hydraulic-pressure supply device;
a first backup passage connecting the simulation chamber to the second hydraulic circuit;
a second backup passage connecting the second master chamber to the first hydraulic circuit;
a cut valve provided in the second backup passage, and configured to control flow of the pressing medium;
an electronic control unit configured to control the hydraulic-pressure supply device and a plurality of valves based on information about hydraulic pressure and information about a displacement of the brake pedal;
a first reservoir passage through which the simulation chamber communicates with the reservoir; and
a second reservoir passage through which the second master chamber communicates with the reservoir,
wherein the first reservoir passage is provided with an inspection valve that controls flow of the pressing medium.

9. The electronic brake system according to claim 8, wherein one end of the first backup passage is branched from a location interposed between the inspection valve and the simulation chamber in the first reservoir passage, and other end of the first backup passage is connected to the second hydraulic circuit.

10. The electronic brake system according to claim 9, wherein:
the second hydraulic circuit includes at least one inlet valve configured to control hydraulic pressure flowing into each wheel cylinder, and at least one outlet valve configured to control hydraulic pressure discharged from each wheel cylinder; and
the other end of the first backup passage is connected to a downstream side of the outlet valve in the second hydraulic circuit.

11. The electronic brake system according to claim 8, wherein:
the first hydraulic circuit includes at least one inlet valve configured to control hydraulic pressure flowing into each wheel cylinder, and at least one outlet valve configured to control hydraulic pressure discharged from each wheel cylinder; and
one end of the second backup passage is connected to the second master chamber, and other end of the second backup passage is connected to a location interposed between the inlet valve and the outlet valve in the first hydraulic circuit.

12. An electronic brake system comprising:
a master cylinder including:
a cylinder body connected to a reservoir, the cylinder body having a bore, one end of which is opened in a longitudinal direction,
a piston configured to be movable forward and backward within the bore,
first and second master chambers respectively formed in bores located at front and rear sides of the piston, and configured to discharge a pressing medium;
a pedal simulator provided in a bore, spaced apart from the piston, and configured to provide reaction force in response to pressure from a brake pedal,
a simulation chamber separated from the first master chamber by the pedal simulator, the simulation chamber formed in the bore,
a simulation passage connecting the simulation chamber to the first master chamber, and a simulation valve provided in the simulation passage, and configured to control flow of the pressing medium in response to an opening/closing operation thereof;

a hydraulic-pressure supply device configured to operate by an electrical signal of a pedal displacement sensor detecting a displacement of the brake pedal;

a hydraulic control unit provided with first and second hydraulic circuits, each of which controls flow of hydraulic pressure applied to wheel cylinders installed in wheels by controlling hydraulic pressure discharged from the master cylinder or the hydraulic-pressure supply device;

a first backup passage connecting the simulation chamber to the second hydraulic circuit;

a second backup passage connecting the second master chamber to the first hydraulic circuit;

a cut valve provided in the second backup passage, and configured to control flow of the pressing medium; and an electronic control unit configured to control the hydraulic-pressure supply device and a plurality of valves based on information about hydraulic pressure and information about a displacement of the brake pedal, wherein, when the electronic brake system normally operates, the simulation valve is closed to prevent flow of the pressing medium between the first master chamber and the simulation chamber in a manner that movement of the piston is restricted, such that the simulation valve receives reaction force produced by the pedal simulator.

13. The master cylinder according to claim 12, wherein:

when the electronic brake system abnormally operates (i.e., fallback mode), the simulation valve is open to allow the pressing medium to flow between the master chamber and the simulation chamber in a manner that the piston moves from the pedal simulator while being in press contact with the pedal simulator, the pressing medium contained in the master chamber is transmitted to the second hydraulic circuit through the simulation chamber and the first backup passage, and the pressing medium contained in the second master chamber is transmitted to the first hydraulic circuit through the second backup passage.

* * * * *